(12) United States Patent
Kreuzberg et al.

(10) Patent No.: US 10,935,147 B2
(45) Date of Patent: Mar. 2, 2021

(54) ELECTROMAGNETICALLY ACTUATED VALVE

(71) Applicant: Thomas Magnete GmbH, Herdorf (DE)

(72) Inventors: Edwin Kreuzberg, Daaden (DE); Fabian Rösner, Wenden (DE); Olaf Ohligschlager, Grünebach (DE); Thomas Baum, Hennef (DE); Diego Lehmann, Daaden (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 16/395,711

(22) Filed: Apr. 26, 2019

(65) Prior Publication Data

US 2019/0331241 A1 Oct. 31, 2019

(30) Foreign Application Priority Data

Apr. 28, 2018 (DE) ...................... 10 2018 003 505.1

(51) Int. Cl.
*F16K 11/074* (2006.01)
*F16K 31/10* (2006.01)

(52) U.S. Cl.
CPC .......... *F16K 11/0746* (2013.01); *F16K 31/10* (2013.01)

(58) Field of Classification Search
USPC ................................................ 137/625.33
See application file for complete search history.

(56) References Cited

U.S. PATENT DOCUMENTS

| 1,888,322 | A | 11/1932 | Adolph |
| 2,587,356 | A | 2/1952 | McPherson |
| 6,886,597 | B2 * | 5/2005 | Dragoni .................... F16K 1/44 137/625.33 |
| 7,290,564 | B2 * | 11/2007 | Takahashi .......... F02M 25/0836 137/625.25 |
| 2008/0014103 | A1 | 1/2008 | Cooke |

* cited by examiner

*Primary Examiner* — John Fox
(74) *Attorney, Agent, or Firm* — Harness, Dickey & Pierce, P.L.C.

(57) ABSTRACT

An electromagnetically actuated valve. The electromagnetically actuated valve with a small longitudinal extension, allows great through-flow quantities for the fluid with a small pressure difference. It is intended in this case that it should be producible cost-effectively in large unit numbers. An armature carries a plurality of valve bodies arranged in a point-symmetrical manner which together form a movable valve, wherein the plurality of valve bodies interact with a same plurality of valve seats which together form a stationary valve. The valve can be used along with a pump, a tank and/or other fluid units in assemblies for conveying mixtures of gas and liquid.

10 Claims, 2 Drawing Sheets

ELECTROMAGNETICALLY ACTUATED VALVE

CROSS-REFERENCE TO RELATED APPLICATIONS

This application claims the benefit and priority of German Application No. 10 2018 003 505.1 filed on Apr. 28, 2018. The entire disclosure of the above application is incorporated herein by reference.

FIELD

The present disclosure relates to an electromagnetically actuated valve.

BACKGROUND

This section provides background information related to the present disclosure which is not necessarily prior art.

Electromagnetically actuated valves are known in the art and are widespread. The customary design of valves of this kind with the electromagnet and the fluid valve part in linear arrangement gives rise to a substantial longitudinal extension.

Valves are connected by lines to other fluid components which are represented as pipelines or as bores in a control block. Lines of this kind define the geometric interface with other components.

SUMMARY

This section provides a general summary of the disclosure, and is not a comprehensive disclosure of its full scope or all of its features.

An electromagnetically actuated valve is to be described which, with a small longitudinal extension, allows great through-flow quantities for the fluid with a small pressure difference. It is intended in this case that it should be producible cost-effectively in large unit numbers.

The electromagnetically actuated valve according to the disclosure contains at least one electromagnet with a magnetic coil and an armature and also a stationary valve and a moving valve.

In this case, the valve preferably separates a first fluid chamber from a second fluid chamber when the magnetic coil is energized and connects the two fluid chambers to one another when the magnetic coil is unenergized.

The energized or unenergized condition is referred to as the active state of the magnetic coil.

The armature carries a plurality of valve bodies arranged in a star shape which together form the moving valve.

The plurality of valve bodies in this case interacts with a same plurality of valve seats which together form the stationary valve.

The valve bodies are arranged at the same distance from the centre of the armature at an equal angular distance from the armature.

Further advantageously, three valve bodies are arranged on the armature at an angular distance of 120° in each case.

Likewise, the valve bodies are made of an elastomer material and each have a sealing area effective in differential pressure terms which amounts to less than 25% of the total area active in terms of differential pressure of one of the valve bodies, more preferably less than 10% of the total area in terms of differential pressure.

The part of the armature facing the variable air gap in the electromagnet is advantageously ring-shaped in design and, when the magnetic coil is energized, travels between a ring-shaped outer magnetic pole and a likewise ring-shaped inner magnetic pole.

The armature is movably mounted on a pipe, wherein the first fluid chamber is always fluidically connected to the inside of the pipe, and the second fluid space is sealed in respect of the inside of the pipe when the valve is closed.

In this case, the aforementioned pipe advantageously exhibits a further opening not connected to the second fluid chamber, which opening permanently connects a further unit arranged on the side of the electromagnet facing away from the armature to the first fluid chamber, wherein the aforementioned unit seals the aforementioned opening in respect of the second fluid chamber.

The aforementioned unit may be a further valve, a pump or a fluid-actuated coupling.

A return spring is advantageously arranged between the inner magnetic pole and the armature in such a manner that said return spring acts on the valve to open it, while the electromagnet acts on the valve to close it.

In an alternative embodiment to this, the armature and the return spring are arranged in such a manner that the return spring acts on the valve to open it, while the electromagnet acts on the valve to close it.

Likewise advantageously, when acted upon by an AC voltage with a frequency higher than a given limit frequency the magnetic coil only moves the armature so slightly that the valve is not closed but the fluid surrounding the magnetic coil is heated. The aforementioned limit frequency results primarily from the mass of the armature and the spring rigidity of the return spring.

The valve according to the disclosure is used along with a pump, a tank and/or other fluid units in assemblies for conveying mixtures of gas and liquid but can also be advantageously used in other electro-fluidic units if a small installation length is required.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
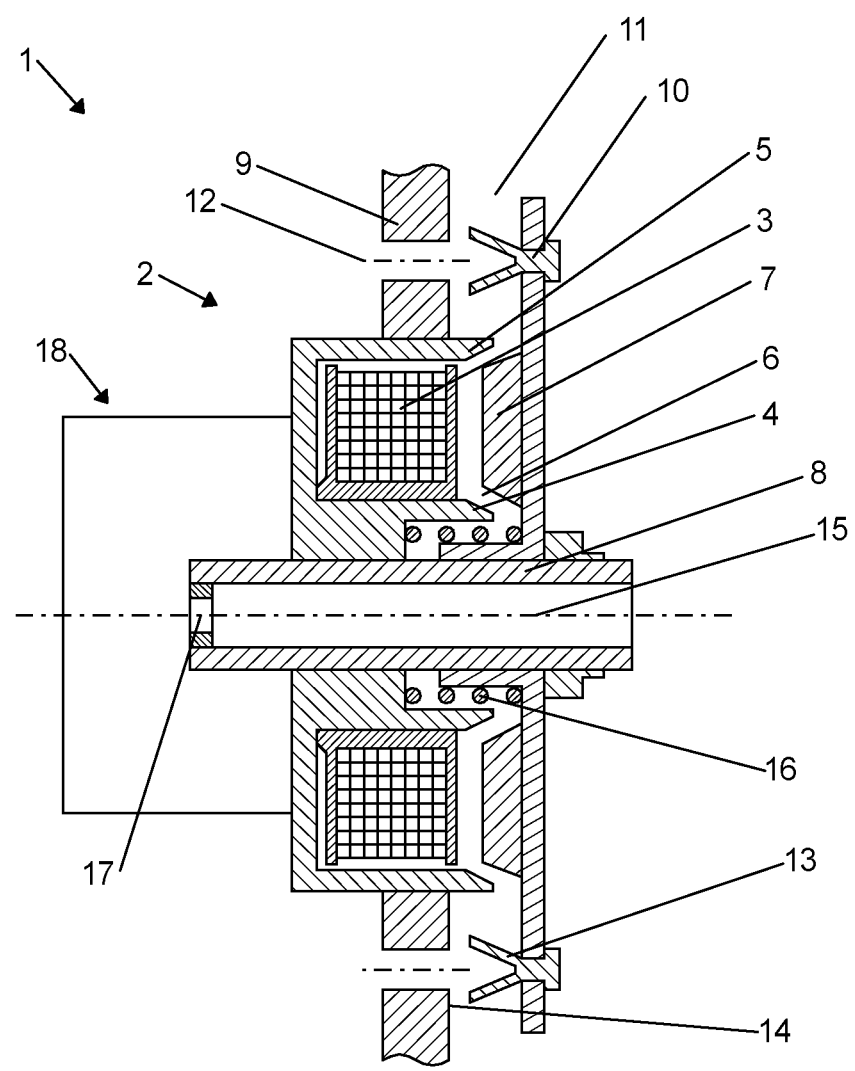
FIG. 1 shows a schematized view of the valve according to the invention.

The exemplary electromagnetically actuated valve (1) according to FIG. 1 contains an electromagnet (2) with a magnetic coil (3) and an armature (7) and also a stationary valve (9) and a movable valve (10).

In this case, the valve (1) separates a first fluid chamber (11) from a second fluid chamber (12) when the magnetic coil (3) is in a first active state and connects the two fluid chambers (11, 12) to one another when the magnetic coil (3) is in a second active state.

The armature (7) carries a plurality of valve bodies (13) arranged in a point-symmetrical manner about the centre line of the armature (7), which valve bodies together form the movable valves (10), wherein the plurality of valve bodies (9) interact with a same plurality of valve seats (14) which together form the stationary valves (9).

The valve bodies (13) are arranged at the same distance from the centre of the armature (7) at an equal angular distance on the armature (7).

Figure 2:
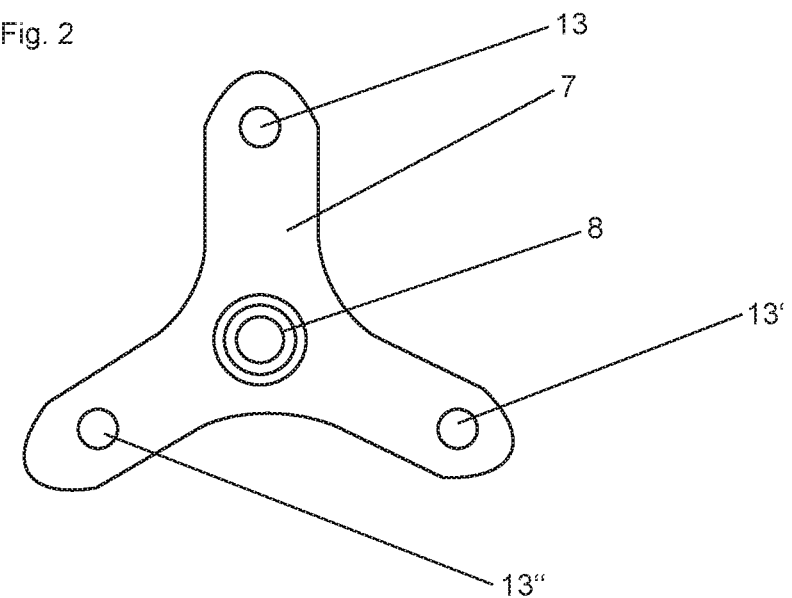
FIG. 2 shows a plan view of the armature with the valve bodies.

In this example, according to FIG. 2, three valve bodies (13, 13', 13") are arranged on the armature (7) at an angular distance of a third of a full circle in each case.

The valve bodies (13) are made of an elastomer material and each have a sealing area effective in differential pressure terms which amounts to less than 25% of the total area of one of the valve bodies (13).

The part of the armature (7) facing the variable air gap (6) of the electromagnet is ring-shaped in design and when the magnetic coil (3) is energized it travels in between a ring-shaped outer magnetic pole (5) and a likewise ring-shaped inner magnetic pole (4).

The armature (7) is movably mounted on a pipe (8).

The first fluid chamber (11) is always fluidically connected to the inside (15) of the pipe (8) and the second fluid chamber (12) is sealed in respect of the inside (15) of the pipe (8) when the valve (1) is closed.

A return spring (16) is arranged between the inner magnetic pole (4) and the armature (7) according to this example in such a manner that it has an opening effect on the valve (1), while the electromagnet (2) has a closing effect on the valve (1).

The pipe (8) has on a further opening (17) which is not connected to the second fluid chamber (12) and which permanently connects a further side of the electromagnet (2) facing away from the armature (7) to the first fluid chamber (11), wherein the unit (18) seals the opening (17) in respect of the second fluid chamber (12).

LIST OF REFERENCE NUMBERS

1. Valve
2. Electromagnet
3. Magnetic coil
4. Inner magnetic pole
5. Outer magnetic pole
6. Air gap
7. Armature
8. Pipe
9. Stationary valve
10. Movable valve
11. Fluid chamber
12. Fluid chamber
13. Valve body
14. Valve seat
15. Inside
16. Return spring
17. Opening
18. Unit The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electromagnetically actuated valve comprising:
   at least one electromagnet with a magnetic coil;
   an armature;
   a stationary valve and a movable valve;
   wherein the electromagnetically actuated valve separates a first fluid chamber from a second fluid chamber when the magnetic coil is in a first active state and connects the two fluid chambers to one another when the magnetic coil is in a second active state,
   wherein the armature carries a plurality of valve bodies arranged in a point-symmetrical manner, which valve bodies together form the movable valve means, wherein the plurality of valve bodies interact with a same plurality of valve seats which together form the stationary valve,
   wherein the armature is movably mounted on a pipe.

2. The electromagnetically actuated valve according to claim 1, wherein the valve bodies are arranged at a same distance from a centre of the armature at an equal angular distance on the armature.

3. The electromagnetically actuated valve according to claim 2, wherein three valve bodies are arranged on the armature at an angular distance of a third of a full circle in each case.

4. The electromagnetically actuated valve according to claim 1, wherein the valve bodies are made of an elastomer material.

5. The electromagnetically actuated valve according to claim 1, wherein the valve bodies each have a sealing area effective in differential pressure terms which amounts to less than 25% of the total area active in terms of differential pressure of one of the valve bodies.

6. The electromagnetically actuated valve according to claim 1, wherein a apart of the armature facing a variable air gap of the electromagnet is ring-shaped in design and when the magnetic coil is energized it travels in between a ring-shaped outer magnetic pole and a likewise ring-shaped inner magnetic pole.

7. The electromagnetically actuated valve according to claim 1, wherein the first fluid chamber is always fluidically connected to the inside of the pipe and the second fluid chamber is sealed in respect of the inside of the pipe when the electromagnetically actuated valve is closed.

8. The electromagnetically actuated valve according to claim 7, wherein the pipe exhibits a further opening not connected to the second fluid chamber, which opening permanently connects a further unit arranged on a side of the electromagnet facing away from the armature to the first fluid chamber, wherein the unit seals the opening in respect of the second fluid chamber.

9. An electromagnetically actuated valve comprising:
   at least one electromagnet with a magnetic coil;
   an armature;
   a stationary valve and a movable valve;
   wherein the electromagnetically actuated valve separates a first fluid chamber from a second fluid chamber when the magnetic coil is in a first active state and connects the two fluid chambers to one another when the magnetic coil is in a second active state,
   wherein the armature carries a plurality of valve bodies arranged in a point-symmetrical manner, which valve bodies together form the movable valve means wherein the plurality of valve bodies interact with a same plurality of valve seats which together form the stationary valve, wherein when acted upon by an AC voltage with a frequency higher than a given limit frequency the magnetic coil only moves the armature so slightly that the electromagnetically actuated valve is not closed but fluid surrounding the magnetic coil is heated.

10. An electromagnetically actuated valve comprising:
at least one electromagnet with a magnetic coil;
an armature;
a stationary valve and a movable valve;
wherein the electromagnetically actuated valve separates a first fluid chamber from a second fluid chamber when the magnetic coil is in a first active state and connects the two fluid chambers to one another when the magnetic coil is in a second active state,
wherein the armature carries a plurality of valve bodies arranged in a point-symmetrical manner, which valve bodies together form the movable valve means, wherein the plurality of valve bodies interact with a same plurality of valve seats which together form the stationary valve,
wherein a return spring is advantageously arranged between an inner magnetic pole and the armature in such a manner that said return spring acts on the valve to open it, while the electromagnet acts on the valve to close it.

* * * * *